United States Patent [19]
Jacob

[11] Patent Number: 4,762,011
[45] Date of Patent: Aug. 9, 1988

[54] ELECTRONIC GAGE

[75] Inventor: Paravila O. Jacob, Sterling Heights, Mich.

[73] Assignee: General Motors Corporation, Detroit, Mich.

[21] Appl. No.: 38,941

[22] Filed: Apr. 16, 1987

[51] Int. Cl.⁴ .................. G01L 5/00; G01B 21/20; G01B 7/28; G01B 7/00
[52] U.S. Cl. .................. 73/865.8; 73/104; 73/857; 73/862.04
[58] Field of Search .............. 73/1 J, 104, 865.8, 73/862.04, 862.54, 856, 857, 860; 33/175, 545, 546, 549, 552

[56] References Cited
U.S. PATENT DOCUMENTS

| | | | |
|---|---|---|---|
| 3,780,573 | 12/1973 | Reus | 73/862.04 X |
| 4,364,182 | 12/1982 | Jones | 73/1 J X |
| 4,400,089 | 8/1983 | Farabaugh | 73/1 J X |
| 4,429,464 | 2/1984 | Burrus | 73/1 J X |
| 4,548,066 | 10/1985 | Martinez et al. | 73/1 J |

*Primary Examiner*—Tom Noland
*Attorney, Agent, or Firm*—Warren D. Hill

[57] ABSTRACT

A gage for quickly testing complex articles for conformance to a standard comprises a fixture configured according to the standard for holding the article and clamping the article into engagement with bearing surfaces. The bearing surfaces are instrumented with force sensors so that articles that deviate from the standard will produce force signals deviating from standard signals. A programmable controller quickly evaluates the signals to accept or reject the article.

3 Claims, 2 Drawing Sheets

4,762,011

ELECTRONIC GAGE

FIELD OF THE INVENTION

This invention relates to gage for quickly and accurately testing articles of manufacture for conformance to a standard, and especially to an electronic gage for such testing.

BACKGROUND OF THE INVENTION

It is well known, in the mass production of articles, to examine some or all of the articles produced to insure that the manufacturing process is working correctly to turn out items of the right shape and size, and to sense trends in changes that reveal processing errors and the need to make adjustments. The inspection is normally accomplished by holding the article in a fixture and measuring a plurality of dimensions of the article with respect to pre-established datum planes. The measurement may be made by conventional instruments such as dial gages, optical instruments and the like. The measurements are generally compiled and compared to standards manually and consequently the procedure is so slow that only a small percentage of the manufactured parts can be checked. More recently, computer vision systems have been employed to measure part dimensions. These are relatively expensive and complex systems requiring computer control, but have the ability to inspect parts quickly enough to gage all parts manufactured.

SUMMARY OF THE INVENTION

It is therefore an object of the invention to provide a relatively simple and inexpensive apparatus for gaging articles rapidly and automatically collecting and evaluating the data.

The invention is carried out by an electronic gage for testing the conformation of articles of manufacture to a standard comprising; a fixture for holding each test article, bearing surfaces on the fixture for contacting the article at test points on the article, clamp means for holding the article into contact with the bearing surfaces, and force sensors on at least some of the bearing surfaces for emitting signals in a preset range of values when an article clamped in the fixture conforms to the standard and for emitting signals outside of the range when the article is out of conformance.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

Figure 1:
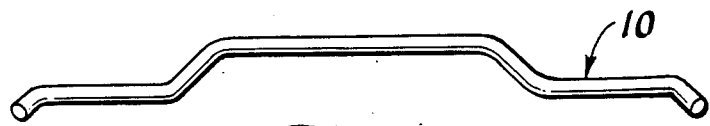
FIGS. 1 and 2 are side and plan views of an article to be gaged.
Figure 2:
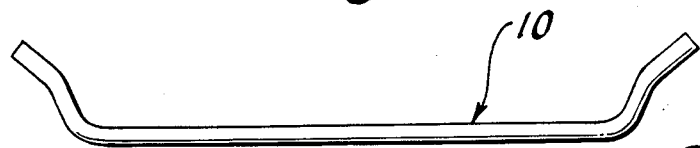

FIGS. 1 and 2 depict a typical vehicle stabilizer bar 10 which is to be checked for conformity to specifications. A "good" bar, verified by conventional measurement techniques, is used as a standard in calibrating the gage described below, and all test bars will be compared to that standard.

Figure 3:
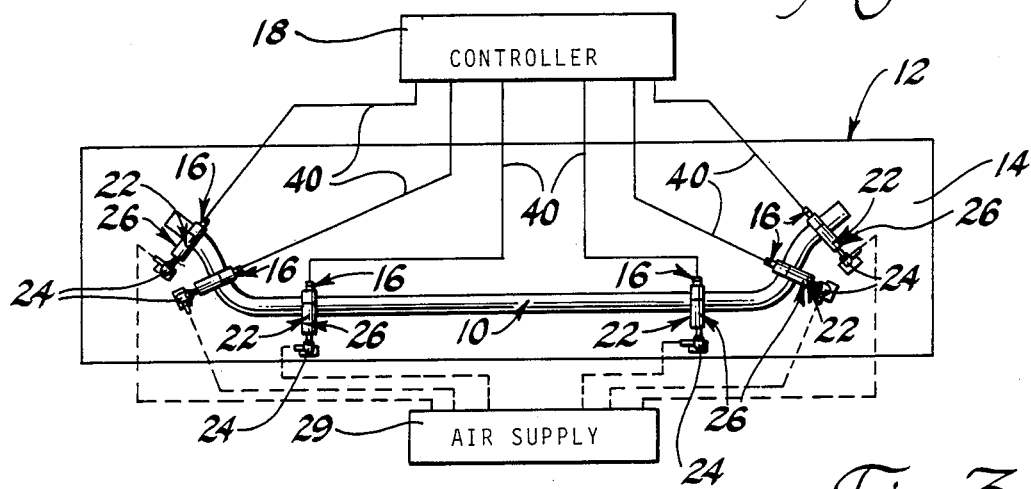
FIG. 3 is a plan view of a gage according to the invention with the article in position for gaging.
Figure 4:
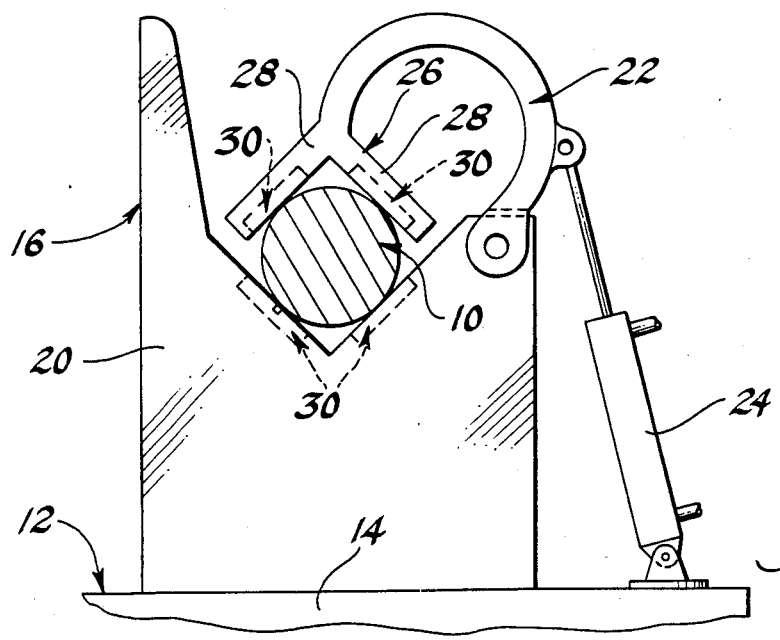
FIG. 4 is a side view of a typical clamp assembly for the gage of FIG. 3.

A gage 12, as shown in FIG. 3, comprises a base 14, several instrumented clamp assemblies 16, and a controller 18 electrically coupled to the outputs of the instrumented clamp assemblies. The clamp assemblies are adjustably mounted on the base 14 to facillitate set-up. The clamp assemblies, shown in FIG. 4, comprise a V block 20, a hinged clamp 22, and an air cylinder or other actuator 24 connected between the hinged clamp 22 and the base 14 for moving the clamp 22 between open and closed position. The clamp 22 has a bifurcated jaw 26 defining two fingers 28 opposing the V block surfaces when in the closed state to securely hold the bar 10. The surfaces of the fingers 28 and the V blocks 20 comprise bearing surfaces which are instrumented with force sensors 30 at the region of contact with the bar 10 so that when the bar is secured in the clamps the force exerted by each clamping surface on the bar 10 can be measured. A regulated air supply 29 supplies uniform operating pressure to the air cylinders.

Figure 5:
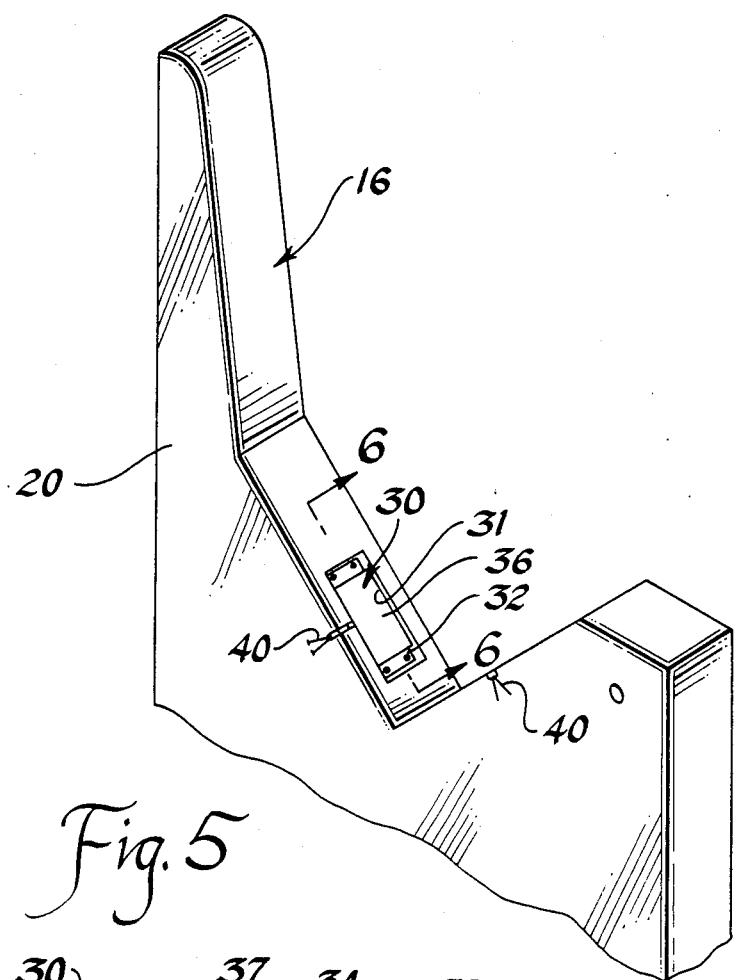
FIG. 5 is an enlarged view of an instrumented V block for a clamp assembly.
Figure 6:
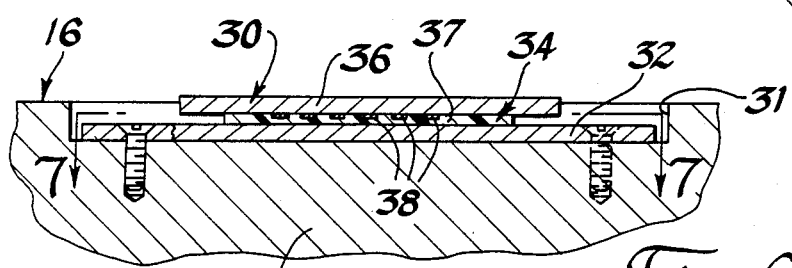
FIG. 6 is a sensor cross-section taken along line 6—6 of FIG. 5.
Figure 7:
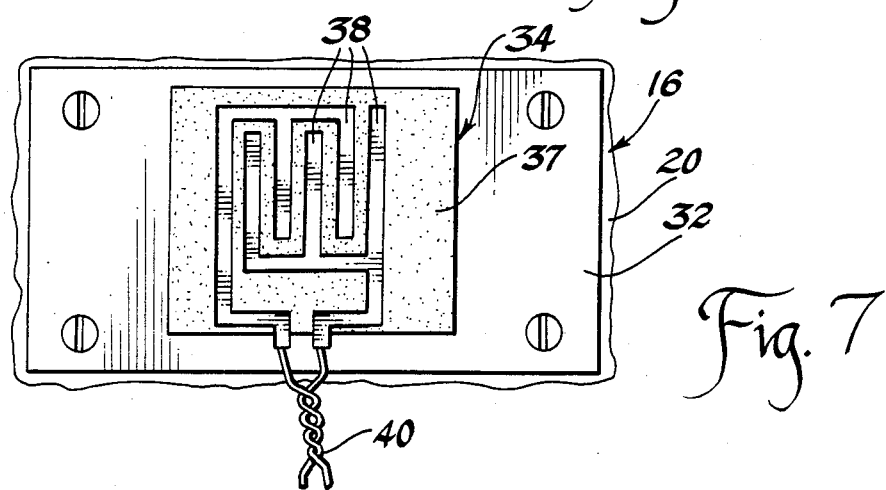
FIG. 7 is a plan view taken along line 7—7 of a force transducer and mounting plate of the sensor according to the invention.

FIGS. 5, 6 and 7 show the instrumentation as applied to the V block, the instrumentation of the jaw 26 being the same. A rectangular recess 31 in the block holds the sensor 30 which comprises a mounting plate 32 that is bolted to the V block, a force transducer 34 which is adhesively secured to the mounting plate and a pressure plate 36 which is adhesively secured to the transducer 34. The exposed surface of the pressure plate 36 is slightly above the block surface and comprises the bearing surface which contacts the bar 10. The force transducer 34 is a thin flat force sensing resistor which is readily sandwiched between the plates and comprises a thick film resistor 37 and a pair of interdigitated electrodes 38 connected to output leads 40. The resistance between the electrodes 38 is variable as a function of the applied force. The force sensing transducer 34 is commercially available from Interlink Electronics, Santa Barbara, Calif.

Evaluation of the sensed resistances is done by the controller 18 which is, for example, an Allen-Bradly Mini PLC 2-15 programmable logic controller. The analog resistance signals carried by the leads 40 to the controller are used by the controller to determine the conformance of the bar 10 to the standard.

In operation, the gage is initially calibrated by placing a standard bar in the clamp assemblies and adjusting the assemblies to obtain a good fit of the bar when the clamps are closed. The readings of the various sensors are accepted by the controller 18 as the ideal values for the bars to be tested. The values do not have to be the same for all the sensors; that is, the clamp assemblies do not have to be perfectly fit to the standard. Even with uniform air pressure on the clamps the clamping forces may be unevenly distributed over the sensors. Variations from the standard bar configuration will cause departures from the ideal values. Limits are set in the controller for each sensor value such that a warning is given when a bar under test exceeds an allowed tolerance.

After set-up, bars are mounted on the gage either manually or automatically and the controller closes the clamps and reads the sensor values. An accept or reject signal is given according to whether the values are in the desired range. Moreover, the values can be monitored and evaluated to reveal trends in changes of bar configuration and identify manufacturing variables which need to be corrected to maintain acceptable parts. It is desireable that the parts be gaged as soon as they are made to gain early detection of any developing problems.

It will thus be seen that the gage according to this invention provides a simple and inexpensive approach to rapidly and easily measuring manufactured articles. The concept is adaptable to articles in a wide range of sizes and shapes.

The embodiments of the invention in which an exclusive property or privilege is claimed are defined as follows:

1. An electronic gage for testing the conformation of articles of manufacture to a standard comprising;
   a fixture for holding each test article, bearing surfaces on the fixture for contacting the article at test points on the article,
   clamp means for holding the article into contact with the bearing surfaces, and
   force sensors on at least some of the bearing surfaces for emitting signals in a preset range of values when an article clamped in the fixture conforms to the standard and for emitting signals outside of the range when the article is out of conformance.

2. An electronic gage as described in claim 1 wherein the bearing surface is a metal plate mounted on the fixture and the force sensor is a flat force sensitive resistor sandwiched between the plate and the fixture.

3. An electronic gage for testing the conformation of articles of manufacture to a standard comprising;
   a fixture for holding each test article, V blocks on the fixture for cradling the article,
   pressure plates on the V blocks for contacting the article at test points on the article,
   actuator operated clamp means for pressing the article into snug contact with the pressure plates, and
   force sensors sandwiched between the V blocks and the pressure plates for emitting signals in a preset range of values when an article clamped in the fixture conforms to the standard and for emitting signals outside of the range when the article is out of conformance.

* * * * *